(12) United States Patent
Brissette et al.

(10) Patent No.: US 10,116,467 B2
(45) Date of Patent: Oct. 30, 2018

(54) ETHERNET TAG MAPPING IN VIRTUAL PRIVATE WIRE SERVICE USING ETHERNET VIRTUAL PRIVATE NETWORK

(71) Applicant: Cisco Technology, Inc., San Jose, CA (US)

(72) Inventors: Patrice Brissette, Gatineau (CA); Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 60 days.

(21) Appl. No.: 15/295,674

(22) Filed: Oct. 17, 2016

(65) Prior Publication Data

US 2018/0109400 A1    Apr. 19, 2018

(51) Int. Cl.
  *H04L 12/46* (2006.01)
  *H04L 12/741* (2013.01)
  *H04L 12/723* (2013.01)

(52) U.S. Cl.
  CPC ...... *H04L 12/4633* (2013.01); *H04L 12/4679* (2013.01); *H04L 45/50* (2013.01); *H04L 45/745* (2013.01)

(58) Field of Classification Search
  None
  See application file for complete search history.

(56) References Cited

U.S. PATENT DOCUMENTS

| | | | |
|---|---|---|---|
| 9,391,885 B1 * | 7/2016 | Shukla | H04L 45/50 |
| 2008/0123651 A1 * | 5/2008 | Vasseur | H04L 12/4633 370/392 |
| 2009/0327797 A1 * | 12/2009 | Wei | H04L 12/4641 714/2 |
| 2011/0078181 A1 * | 3/2011 | Mitsumori | H04L 12/4641 707/769 |
| 2012/0294154 A1 * | 11/2012 | Missett | H04L 43/0811 370/241.1 |

(Continued)

OTHER PUBLICATIONS

Boutros, S., et al., "VPWS support in EVPN," Internet draft, Standards Track, Internet Engineering Task Force (IETF), Jul. 2016, 13 pages.

(Continued)

*Primary Examiner* — George C Atkins
(74) *Attorney, Agent, or Firm* — Meunier Carlin & Curfman LLC

(57) ABSTRACT

Presented herein is an exemplified system and method that facilitate a point-to-point (P2P) service operation, via EVPN VPWS service tunnels, between customer edge nodes and provider edge nodes in a network infrastructure (e.g., a MPLS infrastructure). In particular, the exemplified system and method employ an EVPN BGP construct that facilitates multiplexing across large number of different physical interfaces, among multiple device manufacturers and vendors, while reducing signaling among the nodes, and being fully supportive of EVPN capabilities. In an embodiment, a method is disclosed that establishes VPWS Service service-tunnels, which is associated with an Ethernet virtual private network (EVPN) Ethernet Auto-Discovery (EAD) route identifies the service tunnel as being a VPWS-ID service, a single tag service, or a double tag service.

20 Claims, 5 Drawing Sheets

(56) References Cited

U.S. PATENT DOCUMENTS

2015/0006757 A1* 1/2015 Boutros ............... H04L 45/14
   709/242
2017/0201389 A1* 7/2017 Tiruveedhula ...... H04L 12/1886

OTHER PUBLICATIONS

Sajassi, A., et al., "BGP MPLS-Based Ethernet VPN," Internet draft, Standards Track, Internet Engineering Task Force (IETF), Feb. 2015, 56 pages.

Sajassi, A., et al., "EVPN VPWS Flexible Cross-Connect Service," Internet draft, Standards Track, Internet Engineering Task Force (IETF), Jul. 2016, 12 pages.

* cited by examiner

ETHERNET AUTO-DISCOVERY ROUTE

| | |
|---|---|
| ROUTE DISTINGUISHER (RD) (8 OCTETS) | 302 |
| ETHERNET SEGMENT IDENTIFIER (10 OCTETS) | 304 |
| ETHERNET TAG ID (4 OCTETS) | 306 |
| MPLS LABEL (3 OCTETS) | 308 |

*FIG. 3*

BGP EXTENSION

| | |
|---|---|
| TYPE (0X06) / SUBTYPE (2 OCTETS) | 402 |
| CONTROL FLAGS (2 OCTETS) | 404 |
| L2 MTU (2 OCTETS) | 406 |
| RESERVED (2 OCTETS) | 408 |

PREFIX { (covers 402, 404, 406)

*FIG. 4*

ETHERNET TAG MAPPING IN VIRTUAL PRIVATE WIRE SERVICE USING ETHERNET VIRTUAL PRIVATE NETWORK

TECHNICAL FIELD

The present disclosure relates to operating Virtual Private Wire Service (VPWS) service tunnels in networks.

BACKGROUND

Ethernet Virtual Private Network (EVPN) Virtual Private Wire Service (VPWS) is a VPN service that supplies Layer-2 point-to-point (P2P) connectivity between sites. EVPN can be used to consolidate multiple Layer-2 networking solutions within enterprise or service provider environments into a single networking solution over a common MPLS or IP infrastructure (e.g., a provider MPLS/IP cloud)—i.e., solution to extend local area networks (LANs) as private virtual LANs across and solution to provide P2P service across WANs.

One type of VPWS service tunnel provides connection between sites that are multi-homed (e.g., each site is connected to two more provider edge devices). Due to ambiguity within the usage of the Ethernet Tag ID in the standards for EVPN VPWS, traffic associated with a VPWS service tunnel may be unduly lost at an endpoint node of the service tunnel when there is a failure in the Ethernet segment.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 3 is a diagram of a BGP Network Layer Reachability Information (NLRI) for an EVPN Ethernet Auto-Discovery (EAD) Route.

FIG. 4 is a diagram of a BGP Extended Community for the EAD route of FIG. 3, in accordance with an illustrative embodiment.

DESCRIPTION OF EXAMPLE EMBODIMENTS

Overview

Figure 1:
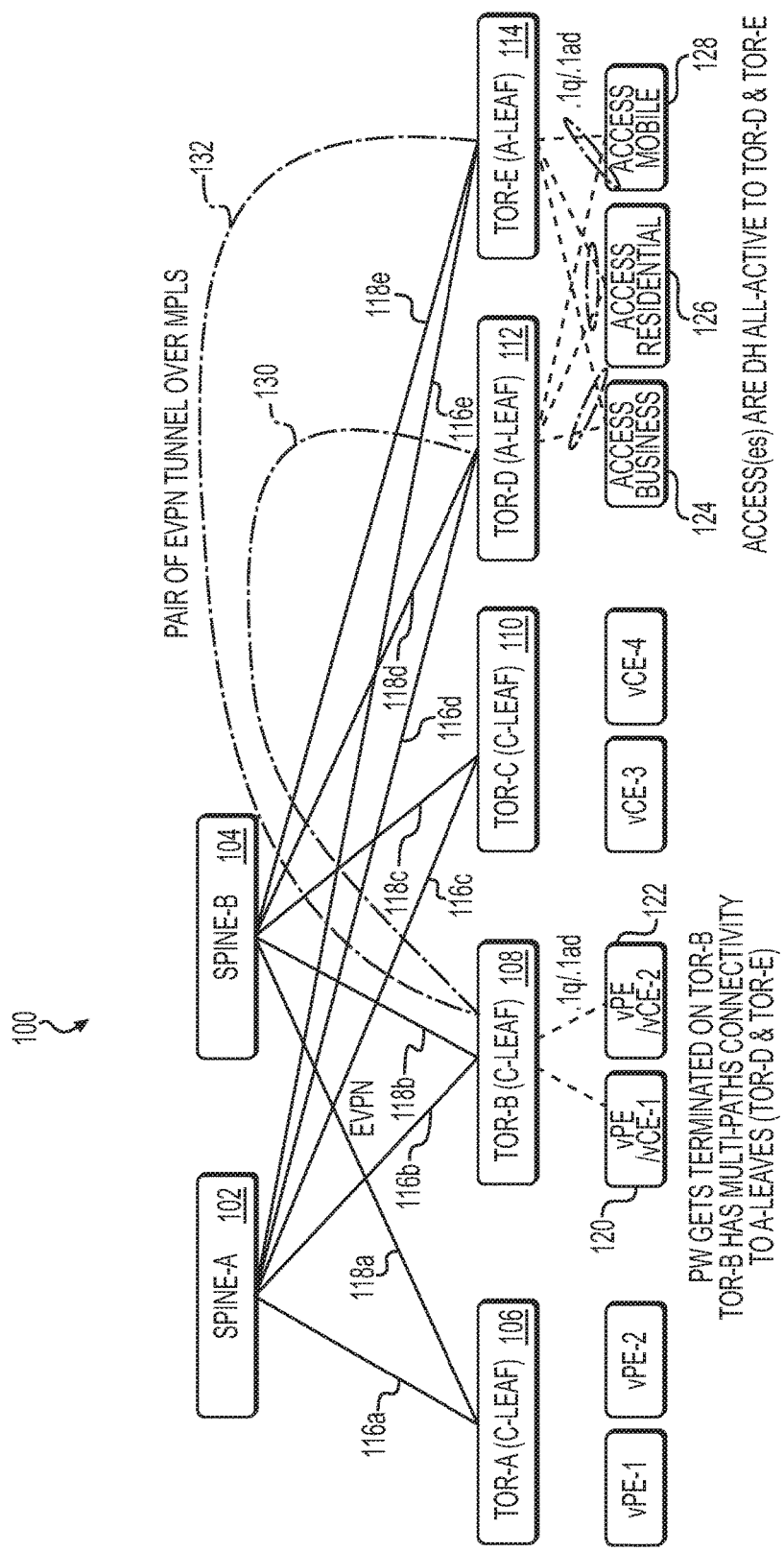
FIG. 1 is a diagram illustrating an example network that includes one or more network devices configured to establishing a VPWS (Virtual Private Wire Service) service tunnel, in accordance with an embodiment.

Presented herein is an exemplified system and method that facilitate a point-to-point (P2P) service operation, via EVPN VPWS service tunnels, between two provider edge nodes in a network infrastructure (e.g., a MPLS infrastructure). In particular, the exemplified system and method employ an EVPN BGP construct that facilitates multiplexing across large number of different physical interfaces, among multiple device manufacturers and vendors, while reducing signaling among the nodes, and being fully supportive of EVPN capabilities as defined in Sajassi et al., "Ethernet VPN", RFC 7432 (February 2015), which is incorporated by reference in its entirety. Further detail of EVPN VPWS is described in Boutros et al., "VPWS support in EVPN" (July 2016), which is also incorporated by reference herein in its entirety.

In an aspect, an apparatus (e.g., a first border/edge node such as an aggregation service router, switch, or host) is disclosed. The apparatus includes one or more network ports; a processor operatively coupled to the one or more network ports; and a memory having instructions stored thereon, wherein the instructions, when executed by the processor, cause the processor to, when establishing, via the one or more network ports, a VPWS (Virtual Private Wire Service) service tunnel with a provider edge (PE) device, associate (e.g., via a Border Gateway Protocol exchange) with the provider edge device an Ethernet virtual private network (EVPN) Ethernet Auto-Discovery (EAD) route, wherein the EVPN EAD route has an Ethernet Segment Identifier (ESI) comprising a control-flag field (e.g., within an EVPN Layer-2 attributes extended community) that identifies a Ethernet Tag ID associated with the VPWS service tunnel as being a VPWS-ID service, a single tag service, and/or a double tag service.

To this end, translation of VLAN IDs (VIDs) for a large number of ACs is properly performed such that the translation results in unique VIDs (either single or double TAG service), particularly for multi-homed services. In addition, by signaling through the control plane per EVI EAD route to bundle several ACs (attachment circuits) on an Ethernet Segment (ES) together per destination ES (or PE) and associated such bundle to a single VPWS service tunnel, signaling among the nodes is reduced.

A provider edge (PE) device is a network device (e.g., a PE router or a router/switch configured to operate with more than one routing protocol, e.g., BGP, OSPF, MPLS) located at the edge of the service provider network. As used herein, a PE device can refer to a TOR ("Top-of-Rack") network device, an EOR ("End of Rack") network device, access switches that form a leaf layer, and any routing or switching device having an addressable identifier that is used in a network of a datacenter or a network of a service provider.

In some embodiments, the control-flag field includes bit fields that designate the VPWS-ID service identifier when configured with a zero value (e.g., bit values of 00 at a first and second position in the bit fields), wherein the control-flag field comprises bit fields that designate the single tag service, when configured with a first non-zero value (e.g., bit values of 01 at the first and the second bit positions in the bit fields), and wherein the control-flag field comprises bit fields that designate the double tag service, when configured with a second non-zero value (e.g., bit values of 10 at the first and the second bit positions in the bit fields).

In some embodiments, the bit fields are located at bit location 11 and bit location 12 of the control-flag field, wherein the control-flag is indexed from 0.

In some embodiments, the Ethernet Tag ID of the double tag service includes a 24-bit identifier that identifies the broadcast domain in an EVPN instance associated with the VPWS service tunnel, wherein the 24-bit identifier comprise a first tag identifier and a second tag identifier, the first tag identifier preceding the second tag identifier in the Ethernet Tag ID. In some embodiments, the first tag identifier is an inner tag identifier and the second tag identifier is an outer tag identifier. In other embodiments, the first tag identifier is an outer tag identifier and the second tag identifier is an inner tag identifier.

In some embodiments, the inner tag identifier is a first tag that is located after the payload of the packet, and the outer tag is a tag that follows the inner tag. The inner tag, in some embodiments, is associated with a customer site or device (also referred to as a "c-tag"), and the outer tag identifier is associated with a server provider site or device (also referred to as a "s-tag").

In some embodiments, a single tag service includes only the outer tag (i.e., s-tag and not the c-tag).

In some embodiments, a double tag services includes an inner tag identifier and an outer tag identifier. The inner tag identifier is specified, in some embodiments, at bit 0 to bit 11 and denotes a destination associated identifier for the c-tag, and the outer tag identifier is specified at bit 12 to bit 23 and denotes a destination associated identifier for the s-tag.

In some embodiments, the inner tag identifier includes a 12-bit identifier located between bit position 20 and bit position 31 when indexed from 0, and wherein the outer tag identifier comprises a 12-bit identifier located between bit position 8 and bit position 19 when indexed from 0.

In some embodiments, the apparatus includes a plurality of attachment circuits, wherein the plurality of the first and second tag identifiers are used to identify the attachment circuits.

In some embodiments, the VPWS service tunnel is established per EVPN EAD route, and wherein each of a pair of provider edge devices instantiating that VPWS service instance each advertises per EVI EAD A-D route with a given VPWS service instance identifier.

In some embodiments, the VPWS (Virtual Private Wire Service) service tunnel are established with attachment circuits of the provider edge (PE) device.

In some embodiments, the bit fields are located at bit locations selected from the group consisting of: bit location 11 and bit location 12 of the control-flag field; bit location 10 and bit location 11 of the control-flag field; bit location 9 and bit location 10 of the control-flag field; bit location 8 and bit location 9 of the control-flag field; bit location 7 and bit location 8 of the control-flag field; bit location 6 and bit location 7 of the control-flag field; bit location 5 and bit location 6 of the control-flag field; bit location 4 and bit location 5 of the control-flag field; bit location 3 and bit location 4 of the control-flag field; bit location 2 and bit location 3 of the control-flag field; bit location 1 and bit location 2 of the control-flag field; and bit location 0 and bit location 1 of the control-flag field, wherein the control-flag field is indexed from 0.

In another aspect, a method (e.g., of operating a VPWS service tunnel) is disclosed. The method includes establishing one or more VPWS (Virtual Private Wire Service) service tunnels each between provider edge (PE) devices (e.g., at attachment circuits of the PE devices, a TOR, a leaf node, etc.) in a network, wherein a given VPWS service tunnel of the one or more VPWS service tunnels is associated with an Ethernet virtual private network (EVPN) Ethernet Auto-Discovery (EAD) route, and wherein the EVPN EAD route comprises an Ethernet Segment Identifier (ESI) (e.g., an EVPN Layer-2 BGP extended community) comprising a control-flag field that identifies an Ethernet Tag ID associated with the VPWS service tunnel as being a VPWS-ID service, a single tag service, and/or a double tag service.

In some embodiments, the control-flag field comprises bit fields (e.g., an Ethernet Tag bit field) that designate the VPWS-ID service when configured with a zero value (e.g., bit values of 00 at a first and second position in the bit fields), wherein the control-flag field (e.g., an Ethernet Tag bit field) comprises bit fields that designate the single tag service, when configured with a first non-zero value (e.g., bit values of 01 at the first and the second bit positions in the bit fields), and wherein the control-flag field comprises bit fields (e.g., an Ethernet Tag bit field) that designate the double tag service, when configured with a second non-zero value (e.g., bit values of 10 at the first and the second bit positions in the bit fields).

In some embodiments, the bit fields are located at bit location 11 and bit location 12 of the control-flag field, wherein the control-flag is indexed from 0.

In some embodiments, the Ethernet Tag ID of the double tag service comprises a 24-bit identifier that identifies the broadcast domain in an EVPN instance associated with the VPWS service tunnel, wherein the 24-bit identifier comprise a first tag identifier (e.g., an outer tag identifier) and a second tag identifier (e.g., an inner tag identifier), the first tag identifier preceding the second tag identifier in the Ethernet Tag ID.

In some embodiments, the first tag identifier comprises a 12-bit identifier located between bit position 20 and bit position 31 when indexed from 0, and wherein the second tag identifier comprises a 12-bit identifier located between bit position 8 and bit position 19 when indexed from 0.

In some embodiments, the VPWS service tunnel is established per EVPN EAD route, and wherein each of a pair of PEs instantiating that VPWS service instance each advertises per EVI EAD A-D route with a given VPWS service instance identifier.

In some embodiments, the provider edge devices comprises a first provider edge device and a second provider edge device, and wherein the first and second tag identifiers are associated with attachment circuits of the first provider edge device.

In another aspect, a non-transitory computer readable medium is disclosed. The computer readable medium includes instructions stored thereon, wherein the instructions, when executed by the processor, cause the processor of a computing device (e.g., a provider edge device) to: when establishing, via one or more network ports of the computing device, a VPWS (Virtual Private Wire Service) service tunnel with a provider edge (PE) device, associate (e.g., via a Border Gateway Protocol exchange) with a second computing device (e.g. a second provider edge device) an Ethernet virtual private network (EVPN) Ethernet Auto-Discovery (EAD) route, wherein the EVPN EAD route has an Ethernet Segment Identifier (ESI) comprising a control-flag field (e.g., within an EVPN Layer-2 extended community) that identifies the type of Ethernet Tag ID associated with the VPWS service tunnel as being a VPWS-ID service, a single tag service, and/or a double tag service.

In some embodiments, the control-flag field comprises bit fields (e.g., an Ethernet Tag bit field) that designate the VPWS-ID service when configured with a zero value (e.g., bit values of 00 at a first and second position in the bit fields), wherein the control-flag field (e.g., an Ethernet Tag bit field) comprises bit fields that designate the single tag service, when configured with a first non-zero value (e.g., bit values of 01 at the first and the second bit positions in the bit fields), and wherein the control-flag field comprises bit fields (e.g., an Ethernet Tag bit field) that designate the double tag service, when configured with a second non-zero value (e.g., bit values of 10 at the first and the second bit positions in the bit fields).

In some embodiments, the bit fields are located at bit location 11 and bit location 12 of the control-flag field, wherein the control-flag is indexed from 0.

In some embodiments, the Ethernet Tag ID of the double tag service comprises a 24-bit identifier that identifies the broadcast domain in an EVPN instance associated with the VPWS service tunnel, wherein the 24-bit identifier comprise a first tag identifier (e.g., an outer tag identifier) and a second tag identifier (e.g., an inner tag identifier), the first tag identifier preceding the second tag identifier in the Ethernet Tag ID.

Example Network

FIG. 1 is a diagram illustrating an example network 100 that includes one or more network devices configured to establishing a VPWS (Virtual Private Wire Service) tunnel, in accordance with an embodiment. As shown in FIG. 1, as a non-limiting example, a network 100 includes a plurality of spine nodes (e.g., router or switches) (shown as "Spine-A" 102 and "Spine-B" 104) that are coupled to a plurality of leaf nodes (e.g., router or switches) (shown as "TOR-A" 106, "TOR-B" 108, "TOR-C" 110, "TOR-D" 112, and "TOR-E" 114) across a number of EVPN (Ethernet Virtual Private Network) links (shown as 116a-116e and 118a-118e).

As shown in FIG. 1, leaf node "TOR-B" 108 is operatively connected, via pseudowire, to a plurality of edge devices including a first edge device 120 (shown as "vPE/vCE-1" 120) and a second edge device 122 (shown as "vPE/vCE-2" 122). The edge devices 120, 122 of leaf node "TOR-B" 108 communicate, over a pair of EVPN tunnel (shown as 130 and 132) over MPLS (Multi-protocol Label Switching), to a plurality of access layer nodes (shown as "Access Business" node 124; "Access Residential" node 126; and "Access Mobile" node 128) attached to leaf node "TOR-D" 112 and to leaf node "TOR-E" 114. The access layer nodes are multi-homed to two or more PEs (e.g., 120, 122), which collectively form a redundancy group that can forward traffic to/from the multi-homed device for a given VLAN. This multi-homing or redundancy is also referred to as "All-Active".

It should be appreciated that FIG. 1 is provided as a non-limiting example to demonstrate the various embodiments disclosed herein. Other network topologies may be used—for example, other customer edge devices or provider edge devices may be used with the embodiments disclosed herein.

Figure 2:
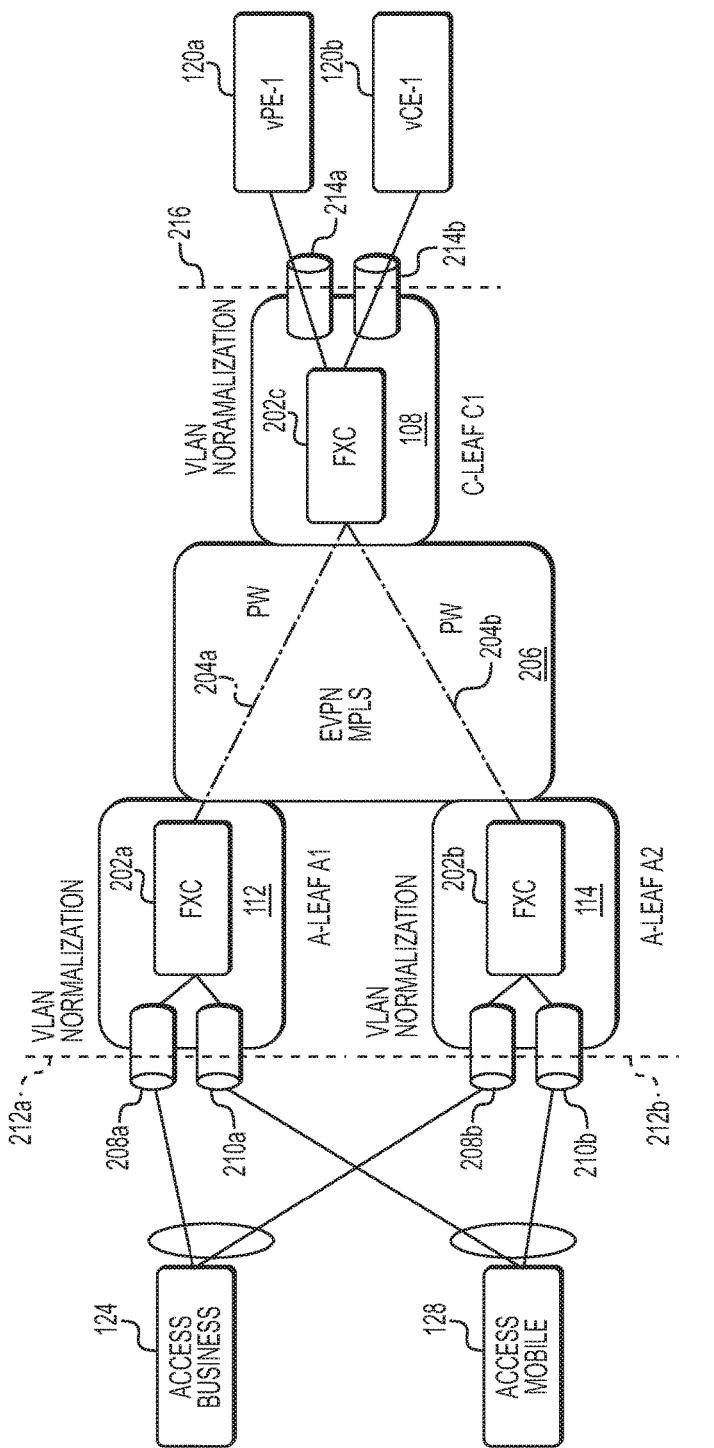
FIG. 2 is a diagram illustrating a cross-connect service for an EVPN VPWS service over the network of FIG. 1, in accordance with an embodiment.

FIG. 2 is a diagram illustrating a cross-connect service 202 (shown as "FXC" 202a and 202b) (also referred to a "flexible cross-connect service") for an EVPN VPWS over the network of FIG. 1, in accordance with an embodiment. Cross-connect service can be used to improve reliability and redundancy, reduce latency, or increase throughput performance for various applications including, for example, but not limited to, within an electronic trading exchange, to link content providers (e.g., content companies) to carriers and ISPs to serve users, to connect metropolitan-area networks, among others.

As shown in FIG. 2, the exemplified cross-connect service 202 provides an EVPN instance comprising VPWS tunnel services that are multiplexed onto a single EVPN VPWS tunnel (e.g., pseudowire shown as "PW" 204a, 204b), over a label switched path (LSP) (shown as "EVPN MPLS" 206), between two infrastructure edge devices (e.g., shown as provider edge device "vPE-1" 120a and customer edge device "cVCE-1" 120b). An EVPN instance (also referred to as an "EVI") includes customer edge devices (CEs) that are connected to provider edge devices (PEs) that form the edge of a MPLS infrastructure and can include one or more broadcast domains. A customer edge device (CE) may be a host, a router or a switch, and the provider edge devices (PEs) provide virtual Layer 2 bridged connectivity between the customer edge devices (CEs).

As shown in FIG. 2, a first access layer node 124 (shown as "Access Business" 124) and a second access layer node 128 (shown as "Access Mobile" 128) each establishes a P2P service (e.g., a VPWS) between a first pair of Attachment Circuits (ACs) (shown as 208a and 210a) and a second pair of attachment circuits (ACs) (shown as 208b and 210b).

At the attachment circuits (e.g., 208a, 210a or 208b, 210b), packets received thereat are normalized (shown as "VLAN normalization" 212a and 212b) such that VLAN tags of the received packets match corresponding VLAN tags associated with logical interfaces of the cross-connect service (e.g., 202a or 202b). The normalized packets are then transmitted, through the MPLS infrastructure, over a pseudowire 204a and 204b, from the flexible cross-connect service 202a, 202b associated with each respective leaf node 112, 114, to a corresponding flexible cross-connect service 202c associated with a leaf node 108. At the leaf node 108, flexible cross-connect service 202c replicates the packets at the attachment circuits (e.g., 214a and 214b) to transmit to the provider edge device "vPE-1" 120a and to customer edge device "cVCE-1" 120b. VLAN normalization 216 is performed at the attachment circuit 214a, 214b to translate the VLAN tags associated with the flexible cross connect service to match logical interfaces to the provider edge device "vPE-1" 120a and to customer edge device "cVCE-1" 120b.

The VLAN normalization (e.g., 212a, 212b, 216) is performed such that packets conform to RFC7432 in which VPWS-ID service, single-TAG service, and double-TAG service are supported. When packets are being multiplexed—and each packet includes encapsulation (e.g., of a frame as a payload) that includes a VLAN ID (VID)—the VLAN normalization 212a, 212b is performed to also translate the VLAN IDs of each set of received packets into a unique VID (either single or double). A VLAN ID (VID) is an identifier (e.g., a 12-bit identifier) that identifies a particular broadcast domain (e.g., a VLAN) in an EVPN instance.

In some embodiments, the flexible cross-connect service 202c forwards the packets by performing a first lookup of the EVPN label and a second lookup of the VID (as being either single or double), to send the packet to the right egress endpoint and/or interface. In some embodiments, the first lookup of the EVPN label, e.g., via MPLS lookup, results in an identification of a VID table, and the second lookup, of a normalized VID(s) in that table, results in an identification of the egress endpoint and/or interface. In some embodiments, a VLAN normalization (also referred to as "tag manipulation") is performed as part of the VID table lookup. In other embodiments, the VLAN normalization is performed at the egress interface.

Standards for EVPN VPWS uses RFC-7432 as a primitive but is ambiguous in the usage of Ethernet Tag ID. To this end, a provider edge device that receive a per-EVI/EAD route for an EVPN-VPWS cannot consistently ascertain the meaning of the Ethernet Tag ID (included in the NLRI).

FIG. 3 is a diagram of a BGP Network Layer Reachability Information (NLRI) (also referred to as an EVPN NLRI) for an Extended Auto-Discovery (EAD) Route. In an EVPN, MAC learning between provider edge devices (PEs) occurs in the control plane, which is a multi-protocol Broder Gateway Protocol ("MP-BGP") to advertise MAC reachability information.

As shown in FIG. 3, an Ethernet A-D route-type specific EVPN NLRI includes a Route Distinguisher field 302 (shown as "Route Distinguisher (RD)" 302), an Ethernet Segment Identifier field 304 (shown as "Ethernet Segment Identifier" 304), an Ethernet Tag ID field 306 (shown as "Ethernet Tag ID" 306), and a MPLS label field 308 (shown as "MPLS label" 308). Ethernet Segment Identifier field 304 and Ethernet Tag ID field 306 are considered a prefix in the NLRI for the Ethernet A-D route.

An Ethernet Tag ID is a 32-bit field that contains either a 12-bit or 24-bit identifier. That is, when a single normalized VID is used, the lower 12-bit of Ethernet tag field in EVPN routes is set to that VID. And, when double normalized VID is used in the Ethernet Tag ID, the lower 12-bit of Ethernet tag field is set to inner VID and the higher 12-bit is set to the outer VID in the Ethernet Tag ID.

Referring to FIG. 3, the Ethernet Segment Identifier field is set to an ES (Ethernet Segment) associated with the customer and the Ethernet Tag ID 32-bit field is set to the 24-bit VPWS instance identifier. For both Ethernet Private Line (EPL) and Ethernet Virtual Private Line (EVPL) services, for a given VPWS instance the pair of PEs instantiating that VPWS instance each advertises a per-EVI Ethernet A-D route with a corresponding VPWS instance identifier and each is configured with the other PE's VPWS instance identifier. When each PE has received the other PE's per-EVI Ethernet A-D route, the VPWS instance is instantiated. It should be noted that the same VPWS instance identifier may be configured on both PEs.

FIG. 4 is a diagram of a BGP Extension of the EAD route (shown of an EVPN layer-2 attributes extended community 400) of FIG. 1, in accordance with an illustrative embodiment. The EVPN layer-2 attributes extended community is included with the per-EVI Ethernet A-D route. The attribute can be used when single-homing is enabled or when multihoming is enabled. A BGP extended community is added to a BGP route which is advertised to BGP neighbors. A community refers to a group of prefixes that share some common property and can be configured with the BGP community attribute. The BGP community attribute is a numerical value that can be assigned to a specific BGP route and advertised to BGP neighbors. An extended community is an 8-octet value that is also divided into two main sections: a first section that encode a type field in the first 2 octets and a second section that carries data in a format defined by the type field in the last 6 octets.

As shown in FIG. 4, the EVPN Layer-2 Attributes Extended Community 400 includes a type and sub-type field 402, a control-flag field 404, a layer-2 MTU (shown as "L2 MTU" field 406, and a reserved field 408. The type and sub-type field 402 is 16 bits (2 octets) in which the type portion of the field 402 has a hexadecimal value of "0x06". The sub-type portion of the field is a hexadecimal value, and collectively, with the type portion of the field, designates the extended community as the instant EVPN Layer-2 Attributes Extended Community.

Further detail of the layer-2 MTU of described in Boutros et al, "VPWS support in EVPN" (July 2016), which is incorporated by reference herein in its entirety.

Figure 5:
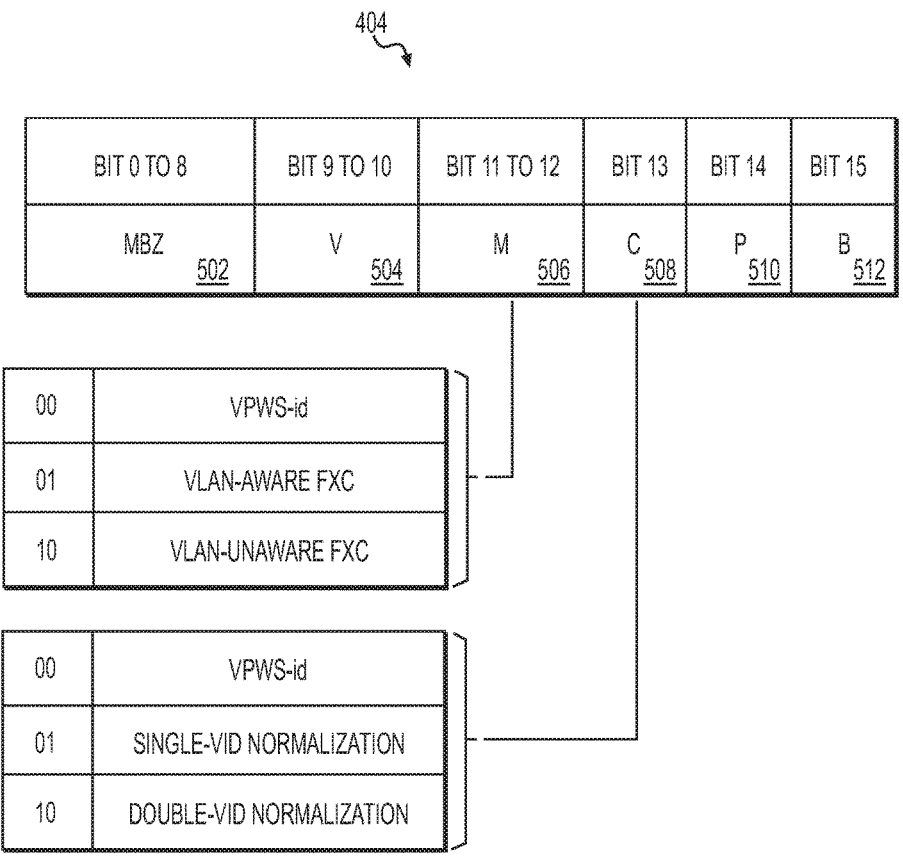
FIG. 5 is a diagram of the control-flag field of FIG. 4, in accordance with an illustrative embodiment.

FIG. 5 is a diagram of the control-flag field 404 of FIG. 4, in accordance with an illustrative embodiment. As shown in FIG. 5, the control-flag field 404 includes 16 bits (2 octets) having a zero-field section 502 (shown as "MBZ" 502, in which MBZ refers to "Must be Zero"), a mode field section 504 (shown as "M" 504), a version field section 506 (shown as "V" 506), a control-word field 508 (shown as "C" 508), a Primary PE field 510 (shown as "P" 510), and a Back-up PE field 512 (shown as "B" 512).

As shown in FIG. 5, the control-flag field 404 includes bit fields that designate i) a VPWS-ID service when the bit fields are configured with a zero value, ii) a single tag service when the bit fields are configured with a first non-zero value, and iii) a double tag service when the bit fields are configured with a second non-zero value. Specifically, the control-flag field 404 includes the version field section 506 that includes 2 bits in which a bit value of "00" specifies a VPWS-ID service, a bit value of "01" specifies a single-VID normalization mode, and a bit value of "10" specifies a double-VID normalization mode.

As shown in FIG. 5, the mode field section 504 includes 2 bits in which a bit value of "00" specifies a EVPN-VPWS mode of operation, a bit value of "01" specifies a VLAN-aware FXC mode, and a bit value of "10" specifies a VLAN-unaware FXC mode.

As discussed in Sajassi et al., "EVPN VPWS Flexible Cross-Connect Service" (July 2016), which is incorporated by reference in its entirety, in the VLAN-Aware Flexible Connect mode of operation, just as the VLAN-unaware mode, many normalized VIDs (ACs) across several different ES's/interfaces are multiplexed into a single P2P EVPN LSP tunnel; however, the single tunnel is represented by many VPWS service IDs (one per normalized VID) and these normalized VIDs are signaled using EVPN BGP.

In addition, on each PE, the multi-homing ACs represented by their normalized VIDs are configured with a single EVI. The Ethernet Tag field of Ethernet A-D route is set to normalized VID. For each normalized VID on each ES, the PE generates an EVPN Ethernet A-D per EVI route where ESI field represents the ES ID, the Ethernet Tag field is set to the normalized VID; MPLS label field is set to dynamically generated EVPN label representing the P2P EVPN LSP tunnel. This route is sent with an RT (Route-Target) representing the EVI. Furthermore, the route is sent with the EVPN Layer-2 Extended Community 400 with two new flags (defined in section 5) that indicate: 1) this VPWS service tunnel is for VLAN-aware Flexible Cross-Connect, and 2) normalized VID type (single versus double). The receiving provider edge device (PE) uses these new flags for consistency check and, in some embodiments, generates an alarm if it detects inconsistency without bringing down the VPWS service. In certain embodiments, the inconsistency may be intentional, e.g., if one side is configured for VLAN-aware VPWS service and another side is configured for VLAN-unaware VPWS service.

In addition, in the VLAN-Aware Flexible Connect mode of operation, the provider edge device (PE) sends a single Ethernet A-D route for each AC that is configured. That is, each normalized VID that is configured per Ethernet Segment (ES) results in generation of an EVPN Ethernet A-D per EVI.

In addition, in the VLAN-Aware Flexible Connect mode of operation, automatic cross checking of normalized VIDs used for EVPL services occurs because the VIDs are signaled in EVPN BGP. For example, if the same normalized VID is configured on three PE devices (instead of two) for the same EVI, then when a PE receives the second EVPN Ethernet A-D (EAD) per EVI route, the PE generates an error message unless the two EVPN EAD per EVI routes include the same ESI.

As discussed in Sajassi et al., "EVPN VPWS Flexible Cross-Connect Service" (July 2016), in the VLAN-Unaware Flexible X-connect mode, a group of normalized VIDs (ACs) on a single ES that are destined to a single endpoint/interface are multiplexed into a single P2P EVPN LSP tunnel represented by a single VPWS service ID. This mode of operation is the same as VLAN-bundle service interface as described in Sajassi et al., "EVPN VPWS Flexible Cross-Connect Service" (July 2016), except that VIDs on Ethernet frames are normalized i) before getting sent over the LSP tunnel, ii) in VLAN-aware mode, or iii) in pure EVPN VPWS mode.

In addition, in the previous two modes of operation, only a single EVPN VPWS service tunnel is needed per pair of PEs. However, in this mode of operation, there can be lot more service tunnels per pair of PEs—that is, there is one tunnel per group of VIDs per pair of PEs and there can be many groups between a pair of PEs, thus resulting in many EVPN service tunnels.

Further description of the control-word field 508, the Primary PE field 510, and the Backup PE field 512 is described in Sajassi et al., "EVPN VPWS Flexible Cross-Connect Service" (July 2016).

As shown in FIG. 5, the 2 bits of the version field section 506 are located at bit location 11 and bit location 12 of the control-flag field 404 (when indexed from 0).

It is contemplated that the version field section 506 may be located at other bit locations.

In other embodiments, the version field section 506 is located at bit location 11 and bit location 12 of the control-flag field 404. In other embodiments, the version field section 506 is located at bit location 10 and bit location 11 of the control-flag field 404. In other embodiments, the version field section 506 is located at bit location 9 and bit location 10 of the control-flag field 404. In other embodiments, the version field section 506 is located at bit location 8 and bit location 9 of the control-flag field 404. In other embodiments, the version field section 506 is located at bit location 7 and bit location 8 of the control-flag field 404. In other embodiments, the version field section 506 is located at bit location 6 and bit location 7 of the control-flag field 404. In other embodiments, the version field section 506 is located at bit location 5 and bit location 6 of the control-flag field 404. In other embodiments, the version field section 506 is located at bit location 4 and bit location 5 of the control-flag field 404. In other embodiments, the version field section 506 is located at bit location 3 and bit location 4 of the control-flag field 404. In other embodiments, the version field section 506 is located at bit location 2 and bit location 3 of the control-flag field 404. In other embodiments, the version field section 506 is located at bit location 1 and bit location 2 of the control-flag field 404. In other embodiments, the version field section 506 is located at bit location 0 and bit location 1 of the control-flag field 404.

Figure 6:
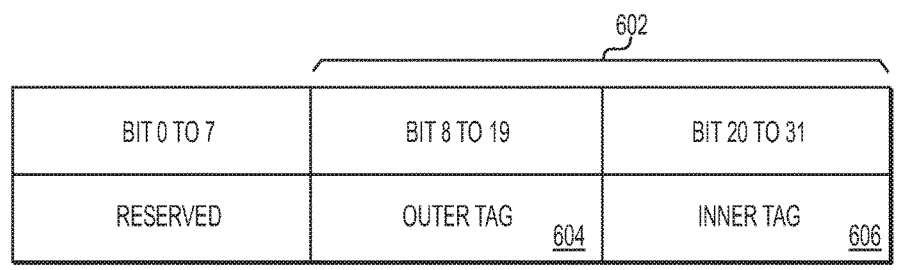
FIG. 6 is a diagram of an Ethernet Tag ID field of FIG. 3 of a double tag service that is specifies according to the EVPN layer-2 attributes extended community of FIGS. 4 and 5, in accordance with an illustrative embodiment.

FIG. 6 is a diagram of an Ethernet Tag ID field 306 of FIG. 3 of a double tag service that is specifies according to the EVPN layer-2 attributes extended community 400 of FIGS. 4 and 5, in accordance with an illustrative embodiment.

As shown in FIG. 6, the Ethernet Tag ID field 306 of the double tag service includes a 24-bit identifier 602 that identifies the broadcast domain in an EVPN instance associated with the VPWS service tunnel, in which the 24-bit identifier 602 includes a first tag identifier 604 (shown as "Outer Tag" 604) that precedes a second tag identifier 606 (shown as "Inner Tag" 606). As shown in FIG. 6, the inner tag identifier 606 is a 12-bit identifier located between bit position 20 and bit position 31 (when indexed from 0), and the outer tag identifier is a 12-bit identifier located between bit position 8 and bit position 19 (when indexed from 0). The first tag identifier is associated with a first attachment circuit (e.g., 208a or 208b, as described in relation to FIG. 2), and the second tag identifier is associated with a second attachment circuit (e.g., 210a or 210b, as described in relation to FIG. 2).

It is contemplated that the Ethernet Tag ID field 306 of the double tag service may have other structures. For example, in other embodiments, the second tag 606 (is located between bit position 8 and bit position 19) and thus precedes the first tag 604 (which is located between bit position 20 and bit position 31).

Figure 7:
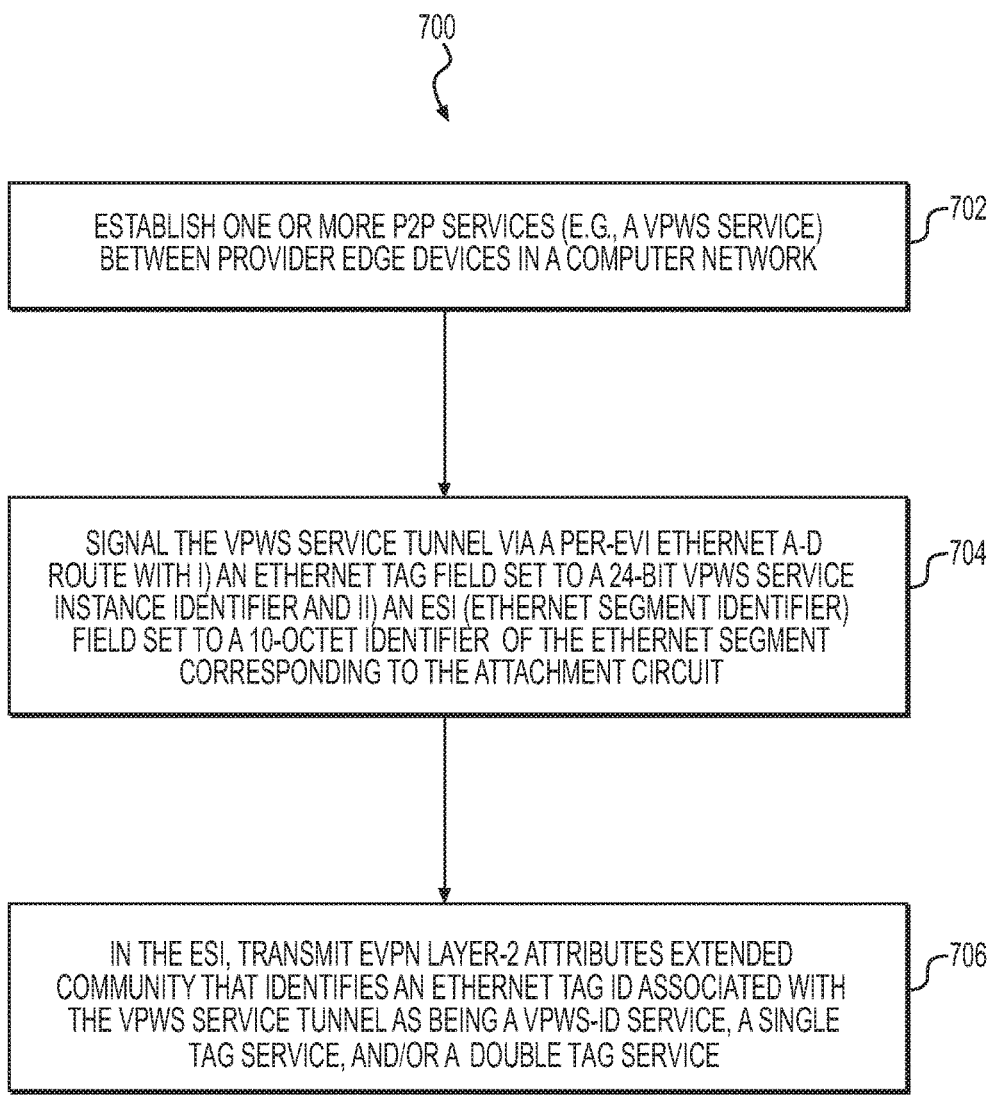
FIG. 7 illustrates an example method 700 of operating EVPN VPWS tunnels between customer edge nodes and provider edge nodes in a MPLS infrastructure, in accordance with an illustrative embodiment.

FIG. 7 illustrates an example method 700 of operating EVPN VPWS tunnels between customer edge nodes and provider edge nodes in a MPLS infrastructure, in accordance with an illustrative embodiment.

The method 700 includes (e.g., a provider edge device) establishing (702) (or participates in establishing) one or more P2P services (e.g., a VPWS service) between provider edge devices in a computer network by associating an attachment circuit of a first provider edge device to a VPWS service tunnel (e.g., a VPWS service instance). The first provider edge device then signals (704) the VPWS service tunnel via a per-EVI Ethernet A-D route with i) an Ethernet Tag field set to a 24-bit VPWS service instance identifier and ii) an ESI (Ethernet Segment Identifier) field set to a 10-octet identifier of the Ethernet Segment corresponding to the attachment circuit. The Ethernet Segment Identifier (ESI) includes an EVPN Layer-2 attributes extended community that identifies an Ethernet Tag ID associated with the VPWS service tunnel as being a VPWS-ID service, a single tag service, and/or a double tag service.

Subsequently, a provider edge device that receives such EVPN routes can associate the VPWS service tunnel to the remote Ethernet Segment. And, when the remote Ethernet Segment fails, and the provider edge device receives a "mass withdraw" message associated with the failed Ethernet Segment, the provider edge device can update a BGP path list for the failed VPWS service tunnel quickly and achieve fast convergence for multi-homing scenarios and to prevent the traffic for the failed VPWS service tunnel from being black-holed.

Although example embodiments of the present invention have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. For example, the embodiments have been shown and described herein with relation to specific protocols and terminology. However, the embodiments in their broader sense are not as limited, and may, in fact, be used with other suitably similar protocols, and may be described using functionally similar terms.

What is claimed is:

1. An apparatus comprising:
   one or more network ports;
   a processor operatively coupled to the one or more network ports; and
   a memory having instructions stored, thereon, wherein the instructions, when executed by the processor, cause the processor to:

when establishing, via the one or more network ports, a Virtual Private Wire Service (VPWS) service tunnel with a provider edge (PE) device, associate with the provider edge device an Ethernet virtual private network (EVPN) Ethernet Auto-Discovery (EAD) route, wherein the EVPN EAD route has an L2VPN Attributes Extended Community comprising a control-flag field that identifies an Ethernet Tag ID associated with the VPWS service tunnel as being a VPWS-ID service, a single tag service, or a double tag service, wherein the control-flag field comprises bit fields that designate the VPWS service tunnel as being the VPWS-ID service when configured with a zero value, wherein the control-flag field comprises bit fields that designate the VPWS service tunnel as being the single tag service when configured with a non-zero value, and wherein the control-flag field comprises bit fields that designate the VPWS service tunnel as being the double tag service when configured with a non-zero value.

2. The apparatus of claim 1, wherein the control-flag field comprises bit fields that designate the single tag service, when configured with a first non-zero value, and wherein the control-flag field comprises bit fields that designate the double tag service, when configured with a second non-zero value.

3. The apparatus of claim 1, wherein the bit fields are located at bit location 11 and bit location 12 of the control-flag field, wherein the control-flag is indexed from 0.

4. The apparatus of claim 1, wherein the Ethernet Tag ID of the double tag service comprises a 24-bit identifier that identifies the broadcast domain in an EVPN instance associated with the VPWS service tunnel, wherein the 24-bit identifier comprise a first tag identifier and a second tag identifier, the first tag identifier preceding the second tag identifier in the Ethernet Tag ID.

5. The apparatus of claim 4, wherein the second tag identifier comprises a 12-bit identifier located between bit position 20 and bit position 31 when indexed from 0, and wherein the first tag identifier comprises a 12-bit identifier located between bit position 8 and bit position 19 when indexed from 0.

6. The apparatus of claim 4, comprising:

a plurality of attachment circuits, wherein the combination of first and second tag identifiers are used to identify the attachment circuits.

7. The apparatus of claim 1, wherein the VPWS service tunnel is established per EVPN EAD route, and wherein each of a pair of provider edge devices instantiating that VPWS service instance each advertises per EVI EAD A-D route with a given VPWS service instance identifier.

8. The apparatus of claim 1, wherein the VPWS service tunnel are established with attachment circuits of the provider edge (PE) device.

9. The apparatus of claim 1, wherein the bit fields are located at bit locations selected from the group consisting of:
bit location 11 and bit location 12 of the control-flag field;
bit location 10 and bit location 11 of the control-flag field;
bit location 9 and bit location 10 of the control-flag field;
bit location 8 and bit location 9 of the control-flag field;
bit location 7 and bit location 8 of the control-flag field;
bit location 6 and bit location 7 of the control-flag field;
bit location 5 and bit location 6 of the control-flag field;
bit location 4 and bit location 5 of the control-flag field;
bit location 3 and bit location 4 of the control-flag field;
bit location 2 and bit location 3 of the control-flag field;
bit location 1 and bit location 2 of the control-flag field; and
bit location 0 and bit location 1 of the control-flag field, wherein the control-flag field is indexed from 0.

10. A method comprising:

establishing one or more Virtual Private Wire Service (VPWS) service tunnels each between provider edge (PE) devices in a network, including between a first provider edge device and a second provider edge device, wherein a given VPWS service tunnel of the one or more VPWS service tunnels is associated with an Ethernet virtual private network (EVPN) Ethernet Auto-Discovery (EAD) route, and wherein the EVPN EAD route comprises an EVPN Layer-2 attributes extended community comprising a control-flag field that identifies an Ethernet Tag ID associated with the VPWS service tunnel as being a VPWS-ID service, a single tag service, or a double tag service wherein the control-flag field comprises bit fields that designate the VPWS service tunnel as being the VPWS-ID service when configured with a zero value, wherein the control-flag field comprises bit fields that designate the VPWS service tunnel as being the single tag service when configured with a non-zero value, and wherein the control-flag field comprises bit fields that designate the VPWS service tunnel as being the double tag service when configured with a non-zero value.

11. The method of claim 10, wherein the control-flag field comprises bit fields that designate the single tag service, when configured with a first non-zero value, and wherein the control-flag field comprises bit fields that designate the double tag service, when configured with a second non-zero value.

12. The method of claim 10, wherein the bit fields are located at bit location 11 and bit location 12 of the control-flag field, wherein the control-flag is indexed from 0.

13. The method of claim 10, wherein the Ethernet Tag ID of the double tag service comprises a 24-bit identifier that identifies the broadcast domain in an EVPN instance associated with the VPWS service tunnel, wherein the 24-bit identifier comprise a first tag identifier and a second tag identifier, the first tag identifier preceding the second tag identifier in the Ethernet Tag ID.

14. The method of claim 13, wherein the first tag identifier comprises a 12-bit identifier located between bit position 20 and bit position 31 when indexed from 0, and wherein the second tag identifier comprises a 12-bit identifier located between bit position 8 and bit position 19 when indexed from 0.

15. The method of claim 10, wherein the VPWS service tunnel is established per EVPN EAD route, and wherein each of a pair of PEs instantiating that VPWS service instance each advertises per EVI EAD route with a given VPWS service instance identifier.

16. The method of claim 10, wherein the provider edge devices comprises a first provider edge device and a second provider edge device, and wherein the combination of first and second tag identifiers are used to identify the attachment circuits on the first and the second provider edge devices.

17. A non-transitory computer readable medium having instructions stored thereon, wherein the instructions, when executed by a processor of a computing device, cause the processor to:

when establishing, via the one or more network ports of the computing device, a Virtual Private Wire Service (VPWS) service tunnel with a provider (PE) device, associate with a second computing device an Ethernet virtual private network (EVPN) Ethernet Auto-Discovery (EAD) route, wherein the EVPN EAD route has an EVPN Layer-2 attributes extended community that identifies a Ethernet Tag ID associated with the VPWS service tunnel as being a VPWS-ID service, a single tag service, or a double tag service, wherein the control-flag field comprises bit fields that designate the VPWS service tunnel as being the VPWS-ID service when configured with a zero value, wherein the control-flag field comprises bit fields that designate the VPWS service tunnel as being the single tag service when configured with a non-zero value, and wherein the control-flag field comprises bit fields that designate the VPWS service tunnel as being the double tag service when configured with a non-zero value.

18. The computer readable medium of claim 17, wherein the control-flag field comprises bit fields that designate the single tag service, when configured with a first non-zero value, and wherein the control-flag field comprises bit fields that designate the double tag service, when configured with a second non-zero value.

19. The computer readable medium of claim 17, wherein the bit fields are located at bit location 11 and bit location 12 of the control-flag field, wherein the control-flag is indexed from 0.

20. The computer readable medium of claim 17, wherein the Ethernet Tag ID of the double tag service comprises a 24-bit identifier that identifies the broadcast domain in an EVPN instance associated with the VPWS service tunnel, wherein the 24-bit identifier comprise a first tag identifier and a second tag identifier, the first tag identifier preceding the second tag identifier in the Ethernet Tag ID.

* * * * *